(12) United States Patent
Soto

(10) Patent No.: US 6,634,689 B1
(45) Date of Patent: Oct. 21, 2003

(54) RETRACTABLE TRUCK CARGO SUPPORT WALLS

(76) Inventor: Teodosio Soto, 553 Ponce de Leon AV, San Juan, PR (US) 00917-4439

(*) Notice: Subject to any disclaimer, the term of this patent is extended or adjusted under 35 U.S.C. 154(b) by 0 days.

(21) Appl. No.: 10/271,373

(22) Filed: Oct. 15, 2002

(51) Int. Cl.$^7$ .................................................. B60P 3/00
(52) U.S. Cl. ........................ 296/3; 296/26.04; 211/195; 211/201
(58) Field of Search ...................... 296/3, 26.04, 26.09, 296/159, 160, 173; 211/195, 200, 201, 206; 224/495, 497, 498, 502, 510, 549

(56) References Cited

U.S. PATENT DOCUMENTS

| | | | | |
|---|---|---|---|---|
| 3,460,864 A | * | 8/1969 | Piercy | ............................ 296/3 |
| 4,585,264 A | * | 4/1986 | Miller | ............................ 296/3 |
| 4,906,038 A | * | 3/1990 | Morris | ............................ 296/3 |
| 4,955,660 A | * | 9/1990 | Leonard | ...................... 296/173 |
| 5,743,583 A | * | 4/1998 | Lowe | ............................ 296/3 |
| 6,332,637 B1 | * | 12/2001 | Chambers | ...................... 296/3 |

* cited by examiner

Primary Examiner—D. Glenn Dayoan
Assistant Examiner—Lori L. Coletta

(57) ABSTRACT

Horizontal members have hollow interior spaces to receive vertical members and other horizontal members therein to stack the horizontal members with a low profile on the sides of the truck in a retracted position. Vertical members have a pivot at one end and a pair of pins at the other end slidable in horizontal grooves in the horizontal members. The vertical members pivot up spacing the horizontal members apart to form vertical side cargo support side walls. Cross braces at each end provide structural stability between the walls. Vertical braces at each end lock the verticals upright.

11 Claims, 3 Drawing Sheets

RETRACTABLE TRUCK CARGO SUPPORT WALLS

BACKGROUND OF THE INVENTION

1. Field of the Invention

The present invention relates to cargo support walls for trucks and in particular to retractable cargo support walls for open trucks, such as pickup trucks, which provide strong interconnected support locked in place when in the upright position and a very low profile when in the stored position.

2. Description of the Prior Art

The pickup truck has grown into an all-around, all-purpose vehicle for basic transportation; part-time truck, full-time work truck and recreational vehicle. In order to improve the cargo carrying function of pick-up trucks, various truck cargo racks have been proposed.

One problem with prior art racks is that while they are needed to stabilize a high load, the rack itself often gets in the way of the actual loading process. Consequently, there is also a need for a folding rack having one or more assemblies which can easily and quickly be folded down for loading and easily and quickly folded up after the load is on the truck bed.

While a number of retractable open truck cargo supports have been developed they lack locked in place interconnected side walls necessary to absorb the shocks of shifting loads leaning or banging against one side or the other during transit.

U.S. Pat. No. 3,460,864, issued Aug. 12, 1969 to Piercy, is for a collapsible truck rack with a series of horizontal rails supported by vertical posts which pivot about one end and have an element at another end which slides within a groove in the horizontal element so that the vertical posts are pivoted down as the horizontal rails are lowered. It has hinged end posts wherein the top half of the end posts pivot down after the horizontal rails are lowered.

U.S. Pat. No. 6,332,637, issued Dec. 25, 2001 to Chambers, shows a rack for securing cargo to a vehicle, the rack comprising: first and second base rails attached to the vehicle; first and second collapsible post having first and second hinge ends and first and second slide ends, wherein the first and second hinge ends are rotatably attached to the first base rail by first and second hinge joints, respectively; a first support rail slidably connected to the first and second slide ends of the first and second collapsible posts by first and second slide joints, respectively, whereby rotation of the first and second collapsible posts about the first and second hinge joints moves the first support rail between support and collapse positions; third and fourth collapsible post having third and fourth hinge ends and third and fourth slide ends, wherein the third and fourth hinge ends are rotatably attached to the second base rail by third and fourth hinge joints, respectively; a second support rail slidably connected to the third and fourth slide ends of the third and fourth collapsible posts by third and fourth slide joints, respectively, whereby rotation of the third and fourth collapsible posts about the third and fourth hinge joints moves the second support rail between support and collapse positions.

U.S. Pat. No. 5,743,583, issued Apr. 28, 1998 to Lowe, claims an auxiliary load supporting apparatus including a substantially rigid frame member receivable by portions of a bed of a pickup truck and having a movable frame member pivotally coupled thereto and movable from a first position and a second position for supporting a load superjacent the bed.

U.S. Pat. No. 4,955,660, issued Sep. 11, 1990 to Leonard, provides a tent-like enclosure installable on the cargo box of a pickup truck to protect cargo or humans within the box. The enclosure is supported on the box by means of a frame structure that includes two inverted U-shaped frame elements having downwardly-extending legs slidably positioned within guide sleeves that are mounted within pre-existing stake pockets (sockets) in the cargo box side walls.

U.S. Pat. No. 4,906,038, issued Mar. 6, 1990 to Morris, describes A livestock enclosure for a pickup truck or the like comprises two foldable rack structures, one for each side wall of the truck body, the structures terminating at the rear of the truck. The racks are collapsible against a vertical head board at the front of the truck body. Locking pins are provided to secure the rack to the wall of the truck. The rear gates may be swung open and if the truck is too close to a cattle chute or other structure, the gates may be opened by lateral movement. A locking bar holds the rack structure in position at the rear of the truck and also is employed to retain the rack in its collapsed position against the cab.

U.S. Pat. No. 4,585,264 issued Apr. 29, 1986 to Miller, discloses A rack for a truck bed which includes separate front and side assemblies, each assembly utilizing a lower frame having dowels for selective insertion into openings into truck bed edges or permanent sidewalls. A first rack member is pivotally attached to each frame of each respective assembly by hinges which are spring biased to cause the first respective rack member to be in folded position wherein the respective first rack member is disposed beside the respective frame and is movable to an extended position wherein the respective first rack member is disposed about the respective frame member. A second rack member of each respective assembly is pivotally attached to a respective one of said first rack member by hinges which are spring biased to cause the second rack member to be in a folded position wherein the respective second rack member is disposed beside the respective first rack member and is movable from such folded position to an extended position in alignment with a respective one of the first rack members. Locking mechanisms are provided for selectively locking the front assembly to the side assemblies whereby such assemblies will be held in the extended position. Locking mechanisms are also provided for selectively locking the assemblies in a folded position.

What is needed is a structurally integrated interconnected retractable cargo support wall system which locks in place.

SUMMARY OF THE INVENTION

An object of the present invention is to provide cargo support walls for pickup trucks and other types of trucks lacking high side walls wherein the support walls have a rigidly integrated support system with cross braces between the two side support walls at each end for structural integrity when in an upright support position and which fold down onto a low profile ridge on top of each side wall of the pickup truck bed so they do not interfere with the normal loading and unloading processes.

Another object of the present invention is to provide retractable elements in each of the side support walls which lock securely in place when in the upright support position and easily release to slide the components together for storing the side walls.

One more object of the present invention is to provide side-to-side cross braces at each end which lock together during use for structural support and which are released and pivot on hinges over against the side wall elements for storage.

An additional object of the present invention is to provide all horizontal side members with hollow interior portions for receiving the vertical members pivoted into the horizontal members to maintain a low provide in the folded down position. a further object of the present invention A contributory object of the present invention is to provide at least one horizontal member with a hollow interior space for receiving another horizontal member stored therein in the folded down position to further assist in maintaining a low profile.

In brief, the present invention is installed on the body rails of a pick-up truck, or the sides of other types of trucks with low sides or no sides, to provide an eye pleasing functional accessory that folds down and stores with a low when not in use and a strong rigid cargo rack that can be raised into a cargo carrying position within seconds, requiring only a wrench to secure it or no tools if wing nuts are used.

The lower horizontal members of each side wall have hollow interior spaces to receive the vertical members which pivot down into them for storage by having a top pin adjacent to the top of each vertical member on each side of the vertical members which top pins slide along horizontal slots in an upper horizontal member to come to rest and lock in a lower lock recess at the end of each horizontal slot and a lower pin on each side adjacent to the bottom pivot point of each vertical member pivotally attached to the lower horizontal member, which lower pins slide in a 90 degree arc slot in each lower horizontal member.

The hollow interior spaces are sufficiently large so that the bottom interior space of the top horizontal member accommodates a top half of the middle horizontal member inside the interior space and a top interior space on the bottom horizontal member accommodates a bottom half of the middle horizontal member, so that when the vertical members are fully down in a horizontal position within the horizontal members, the middle horizontal member rests completely within the top and bottom horizontal members for a low profile. The middle horizontal member is preferably double the height of the top horizontal member and double the height of the bottom horizontal member.

At each front and back end of the top horizontal member, a cross brace member is pivotally attached, preferably by a hinge, and the cross brace pivots 90 degrees away from the horizontal member to overlap the cross brace member from the other side with the overlap portions bolted together to provide structural integrity between the side walls.

Preferably, wing nuts are used for bolting the cross brace members together so that no tools are required for the system. To fold down the walls, the cross braces are unbolted and the cross braces pivoted flat against the top horizontal side members and secured by latches, bolts or other means.

An advantage of the present invention is that it provides for pickups an other trucks retractable support walls having structural integrity.

Another advantage of the present invention is that it provides truck walls which fold down out of the way for loading and unloading.

An additional advantage of the present invention is that no tools are required to raise and lower the walls.

BRIEF DESCRIPTION OF THE DRAWINGS

These and other details of my invention will be described in connection with the accompanying drawings, which are furnished only by way of illustration and not in limitation of the invention, and in which drawings.

BEST MODE FOR CARRYING OUT THE INVENTION

Figure 1:
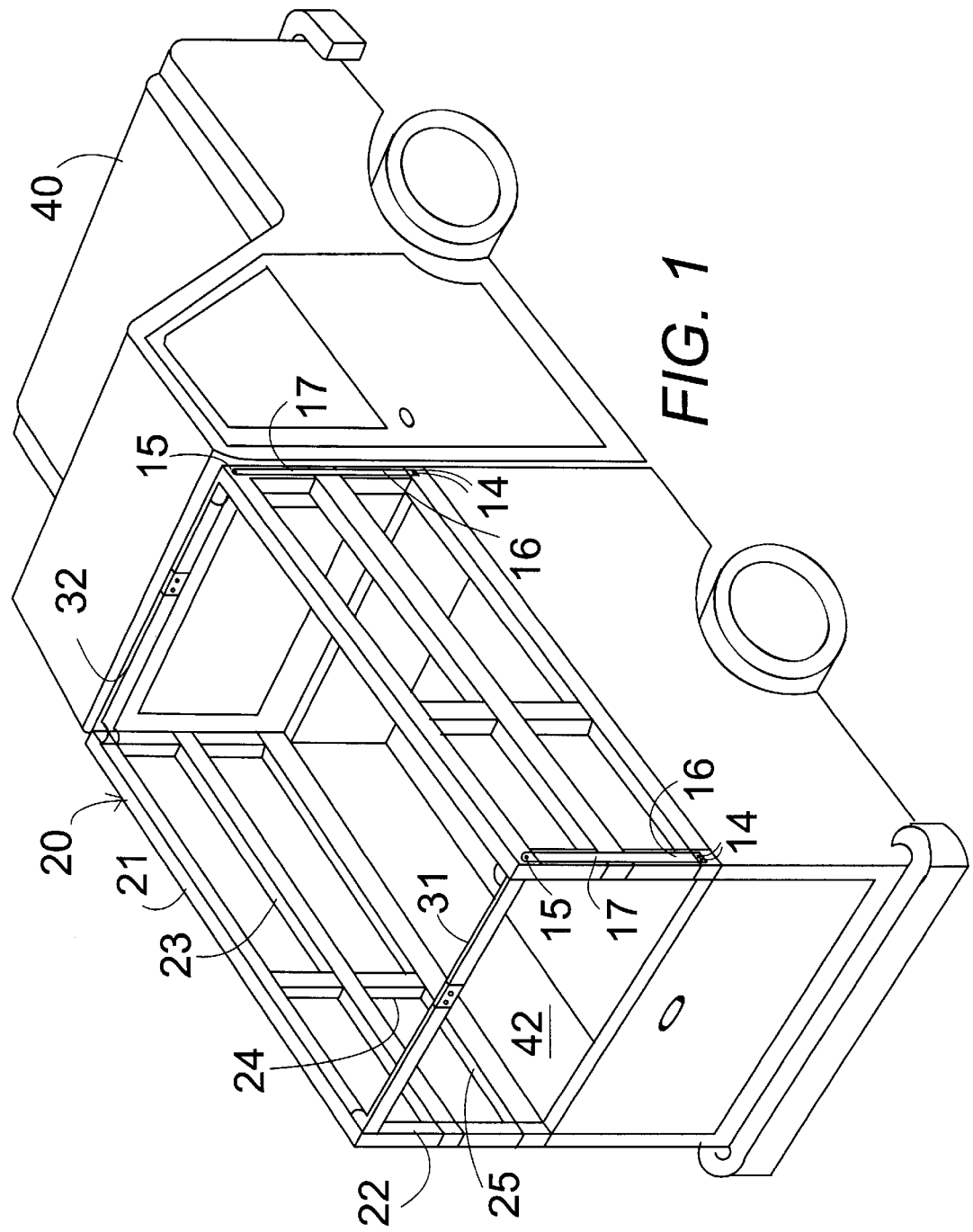
FIG. 1 is a perspective view of a truck having the retractable cargo support walls fully extended and structurally interconnected at each end.
Figure 2:
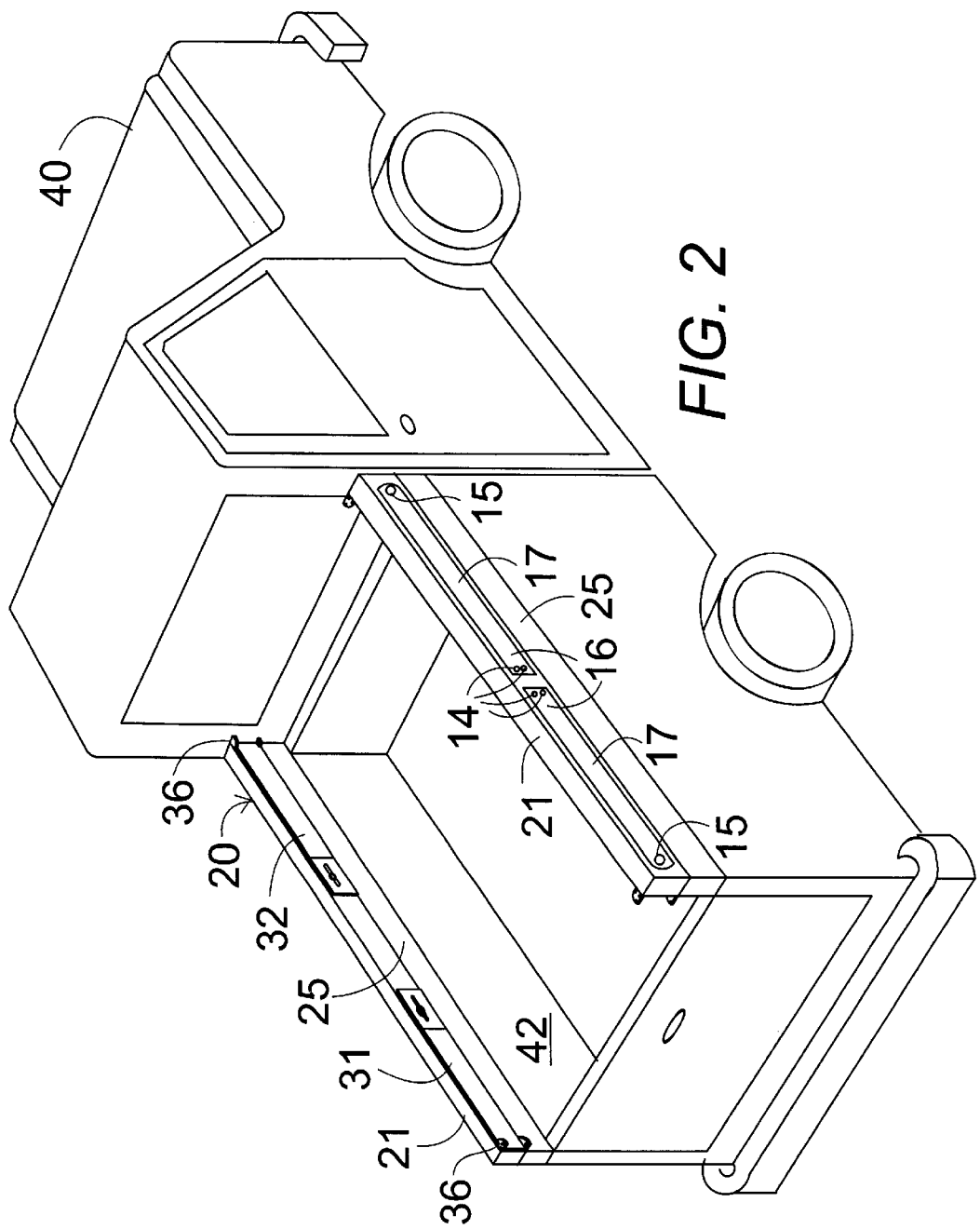
FIG. 2 is a perspective view of the truck of FIG. 1 having the retractable cargo support walls fully retracted onto the side rails of the truck.
Figure 3:
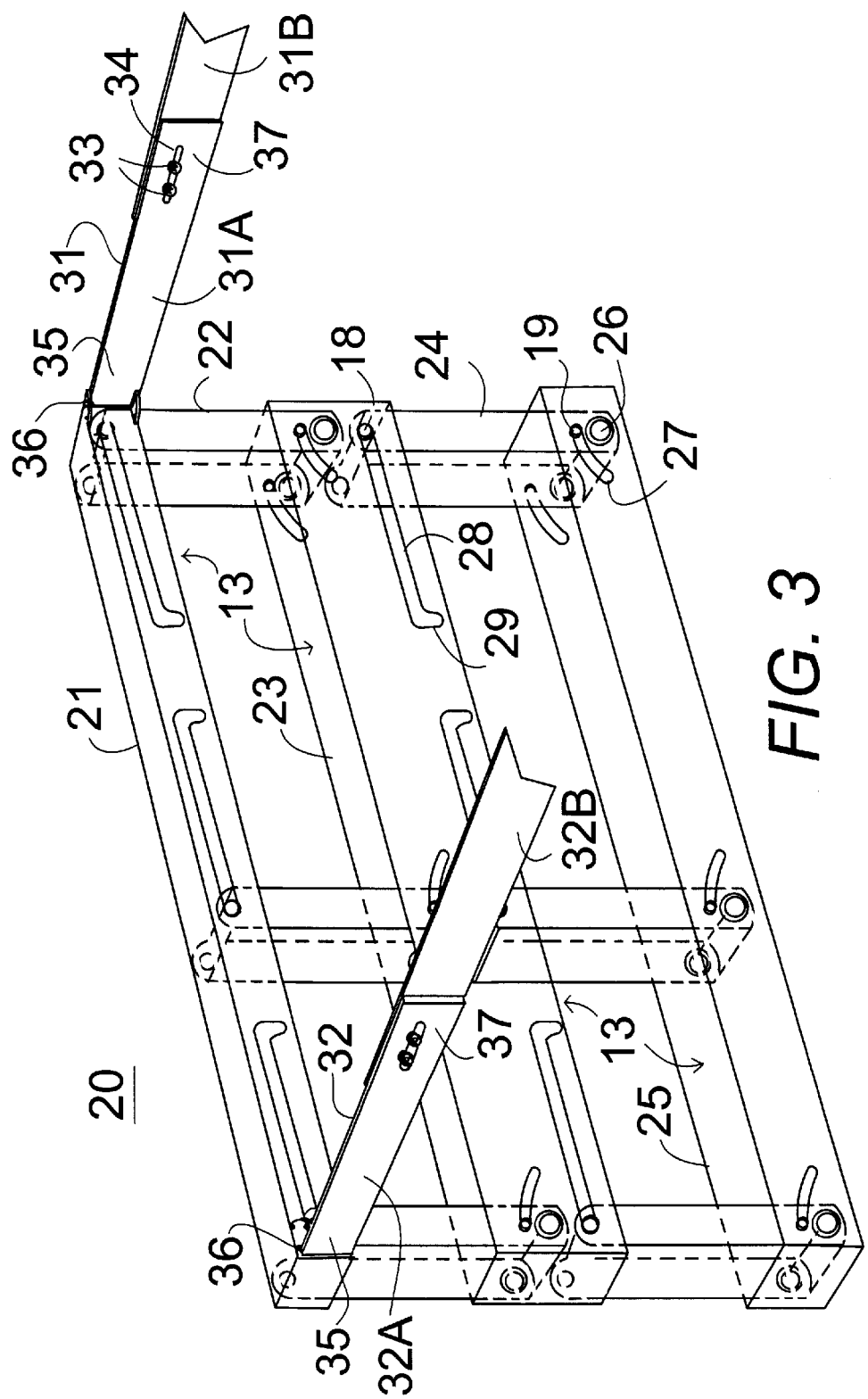
FIG. 3 is a partial perspective diagrammatic view of one the retractable cargo support walls of FIG. 1 fully extended and showing the cross brace interconnected to a portion of the cross brace from the other side.

In FIGS. 1–3, a retractable cargo support system 20 for an open truck comprises two retractable side support walls formed of vertical members 22 and 24 and horizontal members 21, 23, and 25 and interconnecting cross brace members 31 and 32.

At least two and preferably three horizontal members 21, 23, and are capable of being spaced apart in an extended position, as in FIGS. 1 and 3, and stacked together in a retracted position, as in FIG. 2, on each of two opposing sides 42 of an open truck 40.

At least two and preferably three vertical members 22 and 24 extend between and connect each pair of the at least two horizontal members 21, 23, and 25 on each of the at least two opposing sides of the open truck, supporting the upper horizontal member of the pair. Each of the vertical members 22 and 24 is pivotally connected to a first, preferably the lower, of each adjacent pair of horizontal members by a pivot means 26, such as a pin or pivot rod pivotally positioned in a circular opening, at a first end of the vertical member 22 and 24, as seen in FIG. 3. Each of the vertical members 22 and 24 is slidably connected to a second, preferably the upper, of the pair of horizontal members by a slide means, such as a pin 18 in a horizontal groove 28 of the horizontal member, at a second end of the vertical member so that the at least two vertical members are capable of being oriented in a vertical position between the at least two horizontal members in the extended position, as in FIGS. 1 and 3, to form a vertical support wall on each of the at least two sides of the truck and further capable of pivoting downwardly away from the vertical position in the retracted position, as in FIG. 2, for horizontal storage on the sides 42 of the truck 40.

A cross brace member 31 and 32 is attachable at a pivot end 35 by a pivot means, such as a hinge 36, to each end of an upper horizontal member 21, attached on an interior surface of the horizontal member, so that half the cross brace member 31A and 32A is capable of being pivoted away from the upper horizontal member 21 on a first side of the truck to contact the other half of the cross brace member 31B and 32B from the second side of the truck thereby defining an overlap portion 37 on each of the cross brace members 31 and 32, as seen in FIG. 3.

A means for securing together the cross brace members comprises connector such as a bolt means 33, preferably two bolts with wing nuts, in the slots 34 of the overlap portions 37, so that they each form a rigid structural connection between the vertical support walls on each of the two sides 42 of the truck 40.

In FIG. 2, the cross brace members 31 and 32 are capable of being attached at the overlap ends 37 to the upper horizontal member 21 on the same side as the pivots 36 in the retracted position.

In FIGS. 1 and 2, a vertical brace 17 is attached at a first end by a pivot means 15 to each end of a first, preferably the top, horizontal member 21, attached on an exterior surface of the horizontal member, the vertical brace 17 being capable of pivoting between a horizontal orientation in the retracted position, as in FIG. 2, and a vertical position in the extended position, as in FIG. 1. The vertical brace 17 has a second end 16 capable of being attached by a vertical brace attaching means, such as a double set of holes 14 for a more rigid triangulation effect, to a second, preferably the lowest horizontal member 25, to form a vertical brace at each end of each of the vertical support walls. The vertical brace members 17 are capable of being attached at the second end 16 by an attaching means, such as a screw means in the two openings 14, to the first of the horizontal members, the upper horizontal member 21 to which the vertical brace pivot 15 is attached, in the retracted position of FIG. 2.

In FIG. 3, each of the horizontal members 21, 23, and 25 is provided with an internal opening 13 capable of receiving the vertical members 22 and 24 therein and vertical members are capable of being positioned horizontally within the at least two horizontal members in the retracted position of FIG. 2. At least the upper horizontal member 21 is preferably a metal channel with ends, which may be a single open-side-down U-shaped channel in the top horizontal member 21, and the lower horizontal member 25 is preferably a single open-side-up U-shaped. The middle member 23 may be a double U-shaped channel. In the upper and lower horizontal members 21 and 25, the internal openings 13 are capable of each receiving half of the middle horizontal member 23 therein in the retracted position, so that, in FIG. 2, only the upper horizontal member 21 and the lower horizontal member 25 are visible with the middle horizontal member and the vertical members resting inside the other upper and lower horizontal members 21 and 25, thereby minimizing the height of the retracted walls.

In FIG. 3, the opening 13 in each horizontal member 21, 23, and 25 further comprises a horizontal groove 28 having a lower lock recess 29 at one end and the slide means comprises a pin 18 protruding from each side of the second end of the vertical member, the pin 18 being capable of sliding within the horizontal groove 28 and further capable of resting in the lower lock recess 29 in the retracted position of FIG. 2.

The vertical members 22 and 24 further comprise a protruding pin 19 on each of two opposing sides adjacent to the pivot point 26 on the first end and the first horizontal member to which the pivot point 26 is attached is provided with a 90 degree arc slot 27 adjacent to the pivot point on each of the two opposing sides so that the pins 19 move within the 90 degree arc slots 27 between the retracted position of FIG. 2 and the extended position of FIGS. 1 and 3.

The vertical and horizontal members are fabricated of a rigid weather-resistant material, preferably steel channels.

It is understood that the preceding description is given merely by way of illustration and not in limitation of the invention and that various modifications may be made thereto without departing from the spirit of the invention as claimed.

What is claimed is:

1. A retractable cargo support system for an open truck, the system comprising:

at least two horizontal members capable of being spaced apart in an extended position and stacked together in a retracted position on each of at least two opposing sides of an open truck;

at least two vertical members between the at least two horizontal members on each of the at least two opposing sides of the open truck, each of the at least two vertical members pivotally connected to a first of the at least two horizontal members by a pivot means at a first end of the vertical member and each of the at least two vertical members slidably connected to a second of the at least two horizontal members by a slide means at a second end of the vertical member so that the at least two vertical members are capable of being oriented in a vertical position between the at least two horizontal members in the extended position to form a vertical support wall on each of the at least two sides of the truck and further capable of pivoting downwardly away from the vertical position in the retracted position;

a cross brace member attachable at a pivot end by a pivot means to each end of an upper one of the at least two horizontal members so that the cross brace member is capable of being pivoted away from the at least one of the horizontal member on a first side of the truck to contact the cross brace member from the second side of the truck thereby defining an overlap portion on each of the brace members;

a means for securing together the cross brace members so that they each form a rigid structural connection between the vertical support walls on each of the at least two sides of the truck;

a vertical brace attached at a first end by a pivot means to each end of a first of the at least two horizontal members, the vertical brace being capable of pivoting between a horizontal orientation in the retracted position and a vertical position in the extended position, the vertical brace having a second end capable of being attached by a vertical brace attaching means to a second of the at least two horizontal members to form a vertical brace at each end of each of the vertical support walls.

2. The system of claim 1 wherein each of the at least two horizontal members is provided with an internal opening capable of receiving the at least two vertical members therein and the at least two vertical members are capable of being positioned within the at least two horizontal members in the retracted position.

3. The system of claim 2 wherein the opening in each of the at least one horizontal member further comprises a horizontal groove having a lower lock recess at one end and the slide means comprises a pin protruding from each side of the second end of the vertical member, the pin being capable of sliding within the horizontal groove and further capable of resting in the lower lock recess in the retracted position.

4. The system of claim 1 wherein each of the at least two vertical members further comprises a protruding pin on each of two opposing sides adjacent to the pivot point on the first end and the first of the at least two horizontal members is provided with a 90 degree arc slot adjacent to the pivot point on each of the two opposing sides so that the pins move within the 90 degree arc slots between the retracted position and the extended position.

5. The system of claim 1 wherein at least one of the at least two horizontal members is provided with an internal opening capable of receiving at least a portion of the other of the horizontal members therein in the retracted position.

6. The system of claim 1 wherein each of the cross brace members is provided with an overlap opening therethrough in the overlap portion and the means for securing together the cross brace members comprises at least one connector secured through the overlap openings.

7. The system of claim 6 wherein the at least one connector comprises a pair of bolt elements and wing nuts operable by hand.

8. The system of claim 1 wherein the cross brace members are attached on an interior surface of the at least one horizontal member and the vertical brace members are attached on an exterior surface of the at least one horizontal member.

9. The system of claim 8 wherein the cross brace members are capable of being attached at the overlap ends to the upper one of the at least two horizontal members on the same side as the pivot ends in the retracted position.

10. The system of claim 8 wherein the vertical brace members are capable of being attached at the first end by an attaching means to the first of the at least two horizontal members in the retracted position.

11. The system of claim 1 wherein the vertical brace attaching means comprises a pair of spaced openings at the second end for receiving a pair of screw-type attaching means therein.

* * * * *